United States Patent
Van De Velde Keyser

(10) Patent No.: US 6,881,362 B2
(45) Date of Patent: Apr. 19, 2005

(54) PROCESS AND APPARATUS FOR THE RELAXATION OF INTERLAYER SHEET

(75) Inventor: Herbert Sybrant Van De Velde Keyser, Lochristi (BE)

(73) Assignee: N.V. Solutia Europe S.A., Brussels (BE)

( * ) Notice: Subject to any disclaimer, the term of this patent is extended or adjusted under 35 U.S.C. 154(b) by 357 days.

(21) Appl. No.: 10/203,338

(22) PCT Filed: Feb. 12, 2001

(86) PCT No.: PCT/EP01/01370
§ 371 (c)(1),
(2), (4) Date: Aug. 6, 2002

(87) PCT Pub. No.: WO01/62478
PCT Pub. Date: Aug. 30, 2001

(65) Prior Publication Data
US 2003/0030164 A1 Feb. 13, 2003

(30) Foreign Application Priority Data
Feb. 25, 2000 (EP) .......................... 00200651

(51) Int. Cl.[7] .................. B29C 55/02; B29C 71/00; B65H 23/24
(52) U.S. Cl. ................... 264/40.1; 226/7; 226/97.3; 264/342 RE; 264/555; 425/135; 425/445
(58) Field of Search .................. 264/40.1, 342 RE, 264/555; 425/135, 445; 226/7, 97.3

(56) References Cited

U.S. PATENT DOCUMENTS

| | | | |
|---|---|---|---|
| 3,632,726 A | 1/1972 | Knoxs et al. | |
| 3,800,438 A | 4/1974 | Meier | |
| 4,329,315 A | 5/1982 | Brower et al. | |
| 4,437,619 A | 3/1984 | Cary et al. | |
| 4,954,306 A | 9/1990 | Jamet | |
| 5,290,504 A * | 3/1994 | Milkovich et al. | .... 264/342 RE |

FOREIGN PATENT DOCUMENTS

| | | | |
|---|---|---|---|
| EP | 0685316 A1 * | 12/1995 | |
| FR | 2272917 A | 12/1975 | |
| JP | 02022038 A * | 1/1990 | ........... 264/342 RE |

* cited by examiner

Primary Examiner—Leo B. Tentoni
(74) Attorney, Agent, or Firm—Blackwell Sanders Peper Martin LLP

(57) ABSTRACT

A process for relaxation of interlayer sheet is provided which comprises heating the interlayer sheet, followed by leading the heated interlayer sheet over an air-cushion table with regulation of the tension on the interlayer sheet to induce interlayer sheet relaxation and thereafter cooling the relaxed interlayer sheet to the desired temperature for subsequent use. Apparatus suitable for carrying out the process of interlayer sheet relaxation comprising a heating section, an air-cushion table, a tension control and a cooling section is also provided in accordance with the present invention.

10 Claims, 2 Drawing Sheets

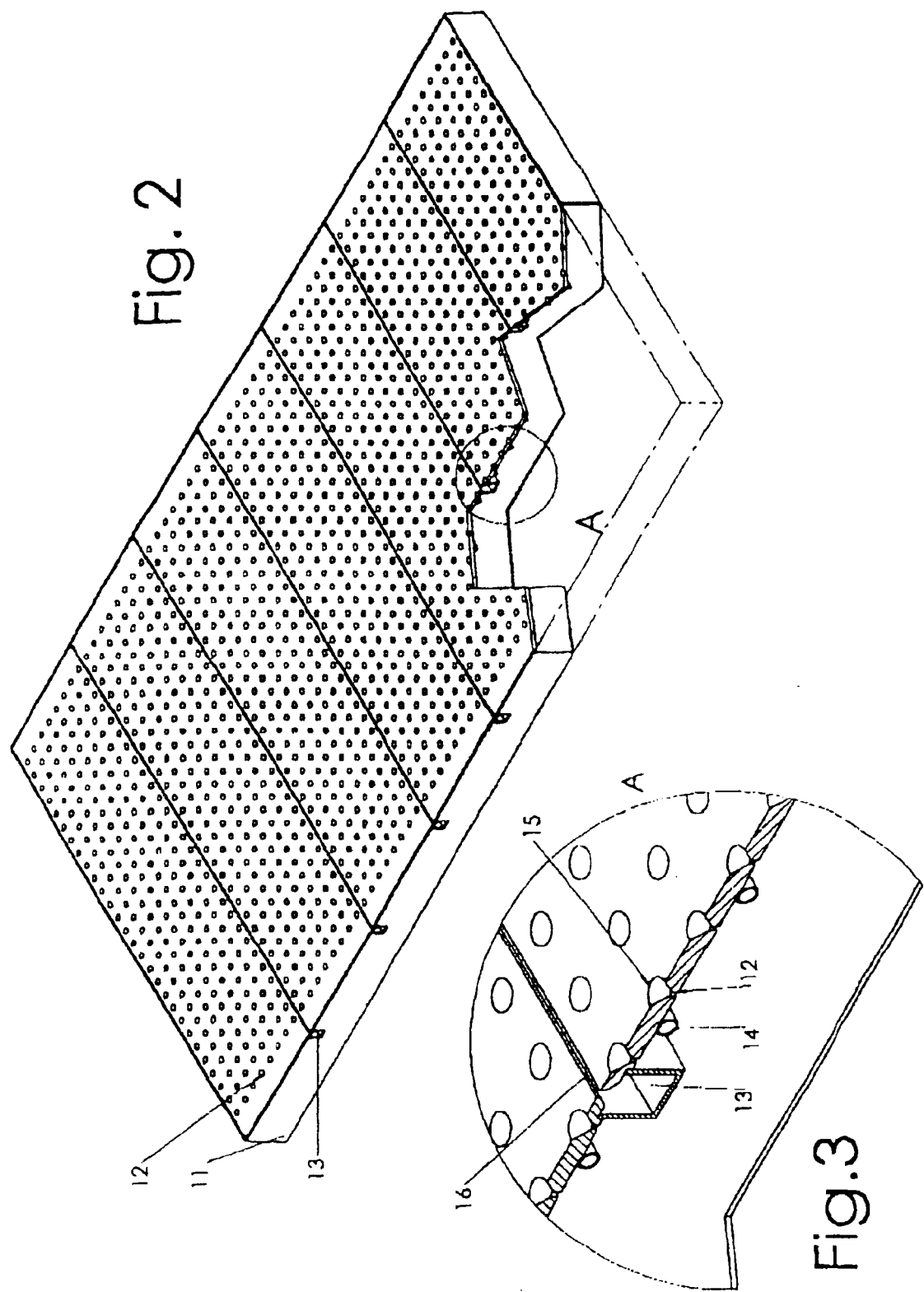

PROCESS AND APPARATUS FOR THE RELAXATION OF INTERLAYER SHEET

BACKGROUND OF THE INVENTION

1. Field of the Invention

This invention relates to a process for the relaxation of interlayer sheet comprising mildly heating the interlayer sheet followed by relaxing of the so heated sheet on an air-cushion table. The tension of the sheet on the air-cushion table is regulated by means of a catenary loop, the weight of which loop is regulated with the aid of a continuons depth measurement. The so relaxed sheet coming from the air-cushion table is thereafter cooled and is characterized by a virtually zero shrinkage. While the interlayer sheet is normally transported over cylindrical rolls, it is understood that the replacement of the cylindrical rolls by conical rolls can equally serve for the beneficial relaxation of shaped polyvinyl butyral sheets. This invention also concerns an apparatus comprising a heating section, an air-cushion table, a tension control section and a cooling section. The tension control section embodies an interlayer catenary loop capable of providing a tension sufficient to keep the interlayer sheet flat and straight on the air-cushion table. The apparatus can beneficially serve for reducing the shrinkage properties of interlayer sheet.

2. Description of the Related Art

Disadvantages attached to interlayer shrinking-phenomena have been known for a long time and no commercially-viable remedies had been made available up to know. Interlayer relaxation technology has been purposely applied to PVB sheets as described in EP-A-0 060 759. In particular, the interlayer sheet is differentially heated to thus create a temperature gradient across the width of the sheet. The sheet is subsequently stretched (20–40%) and thereafter cooled down. The sheet is then stored, generally at a temperature below 10° C., until shortly before use. Before application to the glass, the interlayer sheet is cut and allowed to relax. The cut blanks exhibit shrinkage proportional to the stresses engendered by the temperature profile applied during stretching. The shrinkage properties of interlayer sheets so manufactured are not well controllable and require large oversizes. U.S. Pat. No. 4,954,306 describes a PVB sheet relaxation treatment consisting sequentially of propelling the film through a humidification and heating battery, to thus even out extrusion tensions, followed by a relaxation step wherein the PVB sheet is allowed to form at least one free loop i.e. the sheet is only subject to its own weight and then completing the treatment by means of a conventional cooling step. This process is deficient in that it can only yield limited relaxation due to shrinkage differences between the middle and the borders of the extruded PVB sheet.

U.S. Pat. No. 4,329,315 relates to a method for the manufacture of relaxed PVB sheet consisting of a heating section followed by a relaxation step and a subsequent cooling section. The relaxation step is carried out with the aid of a perforated conveyor belt whereby the first section of the belt runs over a vacuum box, to thus draw along the sheet, while in the thereafter following sections the sheet is floated with the aid of heated air which is blown through the perforations. This method is deficient in that it can provide only very limited relaxation to around 5% as compared to less than 1% shrinkage in accordance with the claimed arrangement.

U.S. Pat. No. 3,696,186 divulges a method for the manufacture of cut-shaped (interlayer) blanks characterized by an implicit relaxation section following an adjustable conical roll (28). The resulting relaxation is partial and the remaining stress causes further uncontrolled relaxation during the application of the interlayer sheet to the qlass, thus requiring additional trimming. While the technology in accordance with EP-A-0 685 316 shows operational benefits as compared to the foregoing art technologies and the sheets manufactured in accordance with the '316 technology show a largely reduced shrinkage, some final trimming is still required.

It is a major object of this invention to provide a process for the relaxation of interlayer sheets to thus yield a significantly reduced shrinkage. It is a further object of this invention to provide an apparatus which can be used for reducing the shrinkage properties of interlayer sheet. It is still another object of this invention to provide a process for the manufacture of interlayer sheet characterized by virtually zero shrinkage. Yet another object of this invention relates to an apparatus which can be inserted into an interlayer shaping line for reducing shrinkage properties of the blanks. The above and other objects of this invention can now be achieved by means of a process including a sheet heating step, followed by a relaxation step with gradual cooling. The relaxation is induced by leading the heated sheet over an air-cushion table while adjusting the sheet tension on said table by means of a catenary loop, the weight of which is controlled with the aid of a continuons depth measurement.

BRIEF DESCRIPTION OF THE INVENTION

This invention concerns a process for the relaxation of interlayer sheet (1,8) comprising a heating step during which the sheet is heated to a temperature from about 30° C. to about 75° C., followed by leading the so heated interlayer sheet over an air-cushion table (3) to thus induce relaxation and cooling whereby the table exit (4) temperature of the sheet is in the range of from about 20° C. to about 45° C. and regulating the tension of the sheet on the air-cushion table with the aid of a subsequent catenary loop (5) and controlling the weight of the loop with a continuous depth measurement (6) to thus secure a flat substantially wrinkle-free and bubble-free sheet surface. After the catenary loop, the sheet is cooled further to a temperature as can be required for the subsequent use of the relaxed sheet (8), generally a temperature below about 25° C. The invention also contemplates an apparatus which can be used beneficially for the relaxation and for reducing the shrinkage properties of interlayer sheet comprising, in sequence, a heating section (2), an air-cushion table (3), a tension control section embodying an interlayer catenary loop (5) and a continuous depth measurement (6) to thus regulate the weight of and the tension on the sheet induced by the catenary loop, and a cooling section (7).

The terms "interlayer sheet", "polyvinyl butyral sheet," and "PVB sheet" are used, throughout the description and claims of this application, interchangeably. While PVB is a well-known and widely used interlayer polymer material it is understood that polymeric materials, other than PVB, can also be used as interlayer material possibly in combination with PVB. Interlayer sheets are used, for example, between glass layers for automotive and/or architectural applications. The terms "air-cushion table" and "relaxation table" are also used interchangeably throughout the description and the claims.

BRIEF DESCRIPTION OF THE DRAWINGS

FIG. 2 is a perspective view of the air-cushion table arrangement in accordance with the inventive technology.

FIG. 3 is a cross section view of the air-cushion table top of FIG. 2 showing particularly a deairing channel.

DETAILED DESCRIPTION OF THE INVENTION

Figure 1:
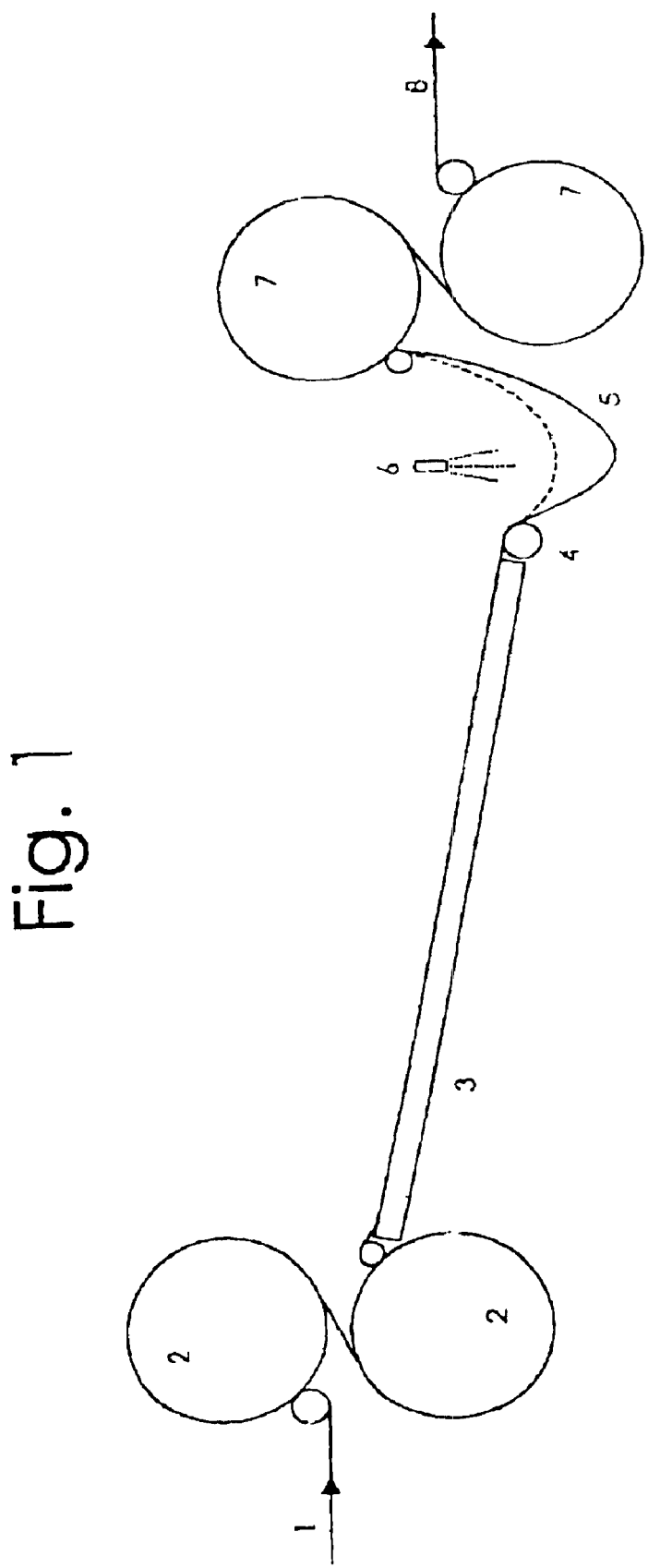
FIG. 1 is an elevation view of the arrangement in accordance with the inventive technology of this application.

The invention will be more clearly understood from the following description of certain preferred embodiments. The inventive interlayer relaxation process herein requires, for a starter, the heating of the interlayer sheet to a temperature from about 30° C. to about 75° C., preferably 45° C. to 70° C., more preferably 52° C. to 60° C. The so-heated interlayer sheet exits the heating section onto the air-cushion table to thus induce relaxation and cooling to the sheet. The top surface of the air-cushion table, over which the interlayer sheet moves, is usually represented by a metal plate having a thickness in the range of from 7 mm (millimeters) to 25 mm, frequently and preferably in the range of from 10 mm to 16 mm. Inasmuch as an additional functionality of the air-cushion table relates to the cooling of the interlayer sheet, it was established that a metal plate exhibiting superior heat transfer (from the interlayer sheet to the table surface) can be represented by aluminum or metals and/or metal alloys having comparable properties. The top surface of the air-cushion table is provided with an adequate number of holes per square meter to provide a layer of air between the surface of the table and the interlayer sheet that is passing over it. The number of holes per square meter is usually in the range of from 100 to 3000, in one preferred execution of from 400 to 1400. The holes have frequently a diameter in the range of from 1 mm to 4 mm, preferably from 1.5 mm to 2.5 mm.

The holes are preferably provided with a cone-shaped outflow to thereby convert the kinetic energy from the air passing through the holes into pressure to thus uniformly support the interlayer sheet. The outflow opening is cone-shaped with an angle of from 40° to 100°, most preferably 50° to 70°.

The top surface of the air-cushion table is, preferably, anodized in black to improve its heat transfer properties as well as its resistance against wear. The air-cushion table is provided with a cooling system capable of efficiently reducing the temperature of the warm interlayer sheet, coming from the heating section, during its passing over the air-cushion table to a reduced temperature, generally in the range of from 20° C. to 45° C. To that effect, the temperature of the air-cushion table is usually kept within the range of from 0° C. to 15° C., preferable within the range of from 2° C. to 6° C., most preferably about 4° C. The cooling system comprises cooling serpentines attached to the underside of the table in between the rows of holes. The cooling serpentines are filled with well-known cooling fluids such as glycol or glycol/water mixtures.

The whole underside of the air-cushion table is encased to form a plenum with numerous holes, as explained above, for blowing cold air upwards, through the holes, against the interlayer sheet, whereby sufficient cooled air is supplied into the plenum to maintain a pressure in the plenum in the range of from 25 to 250 Pa, preferably of from 30 to 150 Pa, most preferably of from 50 to 100 Pa.

The sheet temperature at the exit of the air-cushion table is generally in the range of from about 20° C. to about 45° C., preferably from 28° C. to 40° C. The weight of the catenary loop determines the tension in the sheet on the foregoing air-cushion table. The tension prevents the occurrence of non-uniform relaxation which would lead to wrinkles or bubbles, and the interlayer sheet thus exits the air-cushion table relaxed and substantially as flat as it enters the air-cushion table. Any uneven deformation in the sheet, associated with the relaxation in progress, is compensated in the hot section of the relaxing sheet at the entry side of the air-cushion table. The tension of the interlayer sheet, on the air-cushion table, is controlled by adjusting the setting of the depth measurement which determines the weight of the sheet forming the catenary loop, and as such the tension in the relaxing step. After the catenary loop, the interlayer sheet is further cooled by a complementary cooling section, normally one or more cooling rolls, to a temperature as required by the subsequent use of the relaxed sheet, usually a temperature below 25° C., preferably a temperature of 20° C. or lower.

The inventive apparatus is schematically shown in FIG. 1. Standard polyvinyl butyral sheet (1) is led through a heating section (2), preferably one or more consecutive heated rolls, to thus increase the sheet temperature for an effective relaxation. While heating rolls are well known for increasing the sheet temperature, equivalent heating means such as radiation or convection can also be used conveniently. The sheet then flows down, virtually without tension, over the air-cushion table (3). The air-cushion table comprises a generally rectangular flat box, the top surface of which is provided with multiple small holes, called air-nozzles, through which air can be blown. The air supply comes generally through the bottom of the flat box. The configuration and size of the holes in the air-cushion top surface can be determined routinely and experimentally thereby considering relevant parameters, particularly the physical properties of the interlayer sheet. In flowing down over the air-cushion table, the interlayer sheet is supported by cooled air coming through the holes of the flat box and simultaneously cooled to thus obtain sufficient strength when it reaches the preferably low-friction exit roll (4), considering the weight of the subsequent catenary loop (5). The tension in the sheet is controlled by adjusting the setting of the depth measurement (6) which determines the weight of the PVB sheet forming the catenary loop, and as such the tension in the relaxing step of this process. The depth measurement can be performed by means of conventional equipment as ultrasonic distance measurement or position measurement by light. The output of the depth measurement serves to control the moving speed of the sheet in the subsequent cooling section. After the catenary loop, the sheet is further cooled in a cooling section (7), preferably one or more cooling rolls, resulting in an outflow of relaxed interlayer sheet (8) with virtually zero shrinkage at the desired temperature for e.g. the next production step.

FIG. 2 is a perspective view of the air-cushion table (3) preferably embodying and air-supply box (11) capable of providing substantially uniform air-supply pressure to the air-nozzles (12) to thus provide support air for the moving sheet.

The top of the air-box i.e. the air-cushion table is provided with the air-nozzles. The spacing and the configuration of the nozzles can be determined routinely and/or experimentally. As a practical example, the air-cushion table can have a length of from 1 to 4 meters to thus allow for sufficient relaxation time considering also additional routine operation and sheet related variables. The width of the air-cushion should preferably be slightly larger than the width of the sheet to be relaxed. The air-cushion table has, in one execution, about 600 nozzles per square meter.

FIG. 3 is a cross-section of a preferred air-cushion table top provided with a deairing channel (13). The diameter of the air-nozzles is selected to thus provide sufficient air-flow to float the overlying interlayer sheet. In some preferred executions, the air-nozzles have a diameter from 2 to 3 mm. The air-nozzle outflow opening (15) is, in a preferred execution, a conical angle in the range of from 60 to 90 degrees. One purpose of the conical outflow opening is to distribute the air into a uniform cushion.

The deairing channel allows for the uniform evacuation of the supporting air to thus accomodate and promote the flatness of the relaxing sheet on the air-cushion table. The dimensions of the deairing channel can be selected and optimized routinely. In one execution, the width of the deairing channel entrance (16) can be in the range of from 3 to 10, more preferably 4 to 5 mm. The air-cushion table is provided with cooling means, e.g. cooling tubes (14).

What is claimed is:

1. A process for the relaxation of interlayer sheet comprising:
    (a) heating the interlayer sheet (1) to a temperature from about 30° C. to about 75° C.;
    (b) leading the interlayer sheet from step (a) over an air-cushion table (3) to thus induce relaxation and cooling whereby the exit temperature of the sheet is in the range of from 20° C. to 45° C.;
    (c) regulating the tension of the interlayer sheet on the air-cushion table by varying the weights of the catenary loop (5) with the aid of a continuous depth measurement (6); and
    (d) cooling the relaxed interlayer sheet (8) from step (c) to a temperature as can be required considering the subsequent use of the relaxed interlayer sheet.

2. The process of claim 1 wherein the interlayer sheet, in step (a), is heated to a temperature in the range of from 45.degree. C. to 70.degree. C.

3. The process of claim 2 wherein the exit temperature, in step (b), of the sheet is in the range of from 28.degree. C. to 40.degree. C.

4. The process of claim 3 wherein the relaxed sheet from step (c) is cooled in step (d) to a temperature of 20° C. or lower.

5. An apparatus, particularly suitable for reducing the shrinkage properties of interlayer sheet (1) comprising, in sequence: (a) a heating section (2); (b) an air-cushion table (3), the top of which is provided with deairing channel (13) having a width of the deairing channel entrance (16) in the range of from 3 to 10 millimeters; (c) a tension control section embodying an interlayer catenary loop (5), capable of providing a tension sufficient to keep the interlayer sheet flat and straight on the air-cushion table; and a continuous depth measurement (6) to thus regulate the weight of the catenary loop; and (d) a cooling section (7).

6. The apparatus of claim 5 wherein the surface of the air-cushion table is cooled to a temperature of 40.degree. C. or lower.

7. The apparatus of claim 5 wherein the air used to float the interlayer sheet on the air-cushion table has a temperature of 40.degree. C. or lower.

8. The apparatus of claims 5 and 6 wherein the rolls are comical rolls.

9. The apparatus of claim 5 wherein the air-cushion table comprises an air-supply box (11) and from about 100 to about 3000 cone-shaped holes (air-nozzles) (12) per square meter of the table.

10. The apparatus of claim 9 wherein the holes (air-nozzles) have a diameter in the range of from 1 to 4 mm.

* * * * *

UNITED STATES PATENT AND TRADEMARK OFFICE
CERTIFICATE OF CORRECTION

PATENT NO. : 6,881,362 B2  
DATED : April 19, 2005  
INVENTOR(S) : Herbert S. Van De Valde Keyser Page 1 of 1

It is certified that error appears in the above-identified patent and that said Letters Patent is hereby corrected as shown below:

Column 2,  
Line 2, delete "qlass" and replace with -- glass --

Column 6,  
Line 19, delete "and 6" and replace with -- and 7 --;  
Line 20, delete "comical" and replace with -- conical --

Signed and Sealed this

Twelfth Day of July, 2005

JON W. DUDAS  
*Director of the United States Patent and Trademark Office*